Patented Feb. 11, 1930

1,746,939

UNITED STATES PATENT OFFICE

WINFRID HENTRICH AND LUDWIG ZEH, OF WIESDORF, NEAR COLOGNE, GERMANY, ASSIGNORS TO GENERAL ANILINE WORKS, INC., OF NEW YORK, N. Y., A CORPORATION OF DELAWARE

NEW ACID AZO DYESTUFFS AND PROCESS OF MAKING THE SAME

No Drawing. Application filed February 25, 1927, Serial No. 171,070, and in Germany March 1, 1926.

It has been found that new acid azo-dyestuffs are produced if the ortho-hydroxyazo-dyestuffs, obtained through coupling of ortho-hydroxydiazo-compounds with 1.8-naphthylenediamine or its derivatives, are transformed, in the usual manner, into perimidines or their substitution products or derivatives. The analogous new ortho-hydroxydiazoperimidine-dyestuffs can also be obtained if perimidines suitable for the coupling, or their substitution products or derivatives, are coupled with ortho-hydroxydiazo compounds.

The azo-dyestuffs, obtained through either of the above-mentioned processes, through the influence of metal-segregating media, absorb metals, particularly chromium and copper, thus thereby effecting the production of tinctorially strong metal complex compounds which are especially adapted for use in dyeing animal fibres. The colorings produced in a neutral or acid bath on the fiber by the use of these metal complex compounds are distinguished by evenness and a pronounced fastness to washing, fulling, perspiration, carbonizing and light. If the ortho-hydroxyazoperimidine-dyestuffs, which have been deposited upon animal fiber, are treated with metal-segregating media, during or after the process of coloring, very fast shades having similar properties are obtained.

The dyestuffs are, when dried and ground, generally dark, metallic, lustrous powders, soluble in concentrated sulfuric acid and in water, and having most probably the general formula:

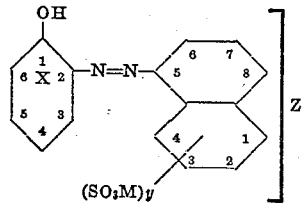

wherein X represents hydrogen, $-NO_2$, $-SO_3H$, $-Cl$, $-COOH$, or alkyl $y$ represents the number 1 or 2, M represents hydrogen or a metal and Z represents a peri-substituent

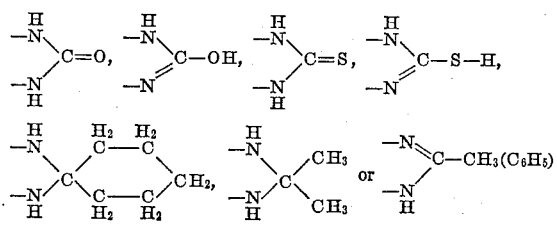

Example 1

The diazo compound of 234 parts by weight of 6-nitro-2-amino-1-hydroxybenzol-4-sulfonic acid is dissolved in an aqueous solution of 238 parts by weight of 1.8-naphthylenediamine-4-sulfonic acid. Through gradual addition of sodium acetate solution the congo-acid reaction of the reaction mixture is slowly dulled. When the coupling is finished, the dyestuff so formed is separated, in the customary manner, from the reaction liquid and then redissolved in cold water with the addition of sodium hydroxide. Phosgene is introduced under stirring at 40° C., taking care to maintain the solution weakly alkaline. When this operation is finished, the thus obtained dihydroperimidone derivative (nomenclature according to Sachs, Ann. 365, 67, 1909) having most probably the formula:

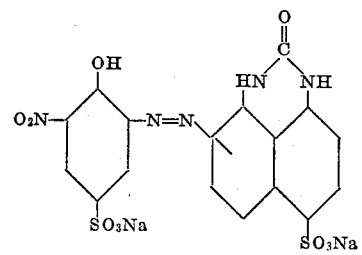

or, respectively: the 2-hydroxyperimidine-derivative:

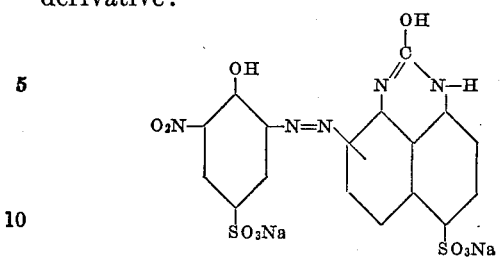

is freed of salt, filtered and washed.

The above described dyestuff is soluble in concentrated sulfuric acid with a bluish-green color, soluble in water with a bluish-red color, and yields, on careful reduction with stannous chloride and hydrochloric acid, 2.6-diamino-1-hydroxy-benzol-4-sulfonic acid and amino-sulfo-dihydro-perimidone.

The same dyestuff can be obtained, if, instead of causing the reaction of the dyestuff from 6-nitro-2-amino-1-hydroxybenzol-4-sulfonic acid and 1.8-naphthylene-diamine-4-sulfonic acid with phosgene, one treats the said dyestuff with potassium-cyanate in an acid solution.

The dyestuff so produced dyes wool, in acid bath bordeau-red; when chromated, the shade changed into a clear greenish-blue fast to fulling, perspiration, carbonizing, and light. The coppered coloring on the fiber is a beautiful blue; the coloring, produced in the bath in the presence of salts of copper, is a greenish-blue of similar qualities.

The copper containing complex compound, which has been obtained according to the above process under warm treatment with salts of copper, dyes wool in an acid bath a beautiful, very even navy-blue shade which is fast to washing, perspiration, fulling and light, possessing a very fine tone under artificial light. The chromium-containing copper complex compound, dyed upon wool, yields an even, greenish-blue shade of good fastness properties.

The copper and chromium compounds above described are soluble in water with a reddish-blue color and in concentrated sulfuric acid with a bluish-green color.

*Example 2*

If, for the diazo-compound of 6-nitro-2-amino-1-hydroxybenzol-4-sulfonic acid in Example 1, there is substituted the diazo compound of 199 parts by weight of 4.6-dinitro-2-amino-1-hydroxybenzol, and otherwise treated in the same manner, a dyestuff is obtained which dyes wool, in an acid bath, a reddish-brown shade. After chroming changes the shade to green. The chromated dyeing is very even and of good fastness to fulling, perspiration and light.

If, in place of phosgenating the product from 4.6-dinitro-2-amino-1-hydroxybenzol and 1.8-naphthylenediamine-4-sulfonic acid, the said product is treated at about 30° C., under very good stirring, with thiophosgene (CSCl$_2$) in the presence of acid-binding media, a dihydrothioperimidone (-2)-derivative, or respectively a 2-mercaptoperimidine-derivative, having most probably the formulæ:

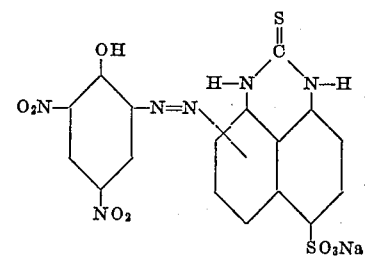

or

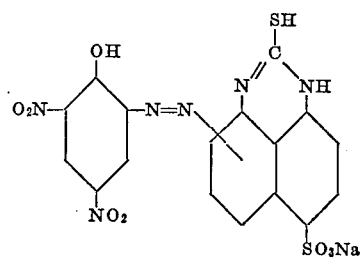

is obtained, which has similar dyeing properties as the above-mentioned dihydroperimidone-derivatives.

The above described phosgenated or thiophosgenated compounds are soluble in water with a brown to bluish-red color. Careful reduction with stannous chloride and hydrochloric acid yields 2.4.6.triamino-1-hydroxy-benzol and in the case of the phosgenated compounds amino - sulfo - dihydro - perimidone-(-2), or in the case of the thiophosgenated compounds amino-sulfo-dihydro-thio-perimidone, respectively.

The copper-containing products, obtained from the said phosgenated or thiophosgenated dyestuffs respectively through treatment with copper salts at raised temperature, dye wool, in an acid bath, even, deep-black shades with a handsome gloss, which dyeings possess very good fastness properties, as for example: fastness to fulling, perspiration and light.

The copper complex compounds of these dyestuffs are soluble in water with a bluish-black color and in concentrated sulfuric acid with a greenish-blue color.

*Example 3*

The diazo-compound, produced in the usual manner from 224 parts by weight of 6-nitro-2-amino-1-hydroxy-benzol-4-sulfonic acid is coupled, in acetic acid solution, with 318 parts by weight of the reaction product from 1 mol. of cyclohexanone and 1 mol. of 1.8-naphthylene-diamine-4-sulfonic acid, having most probably the formula:

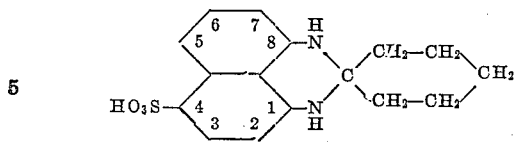

and which is obtained through condensation of the said components in a weak, mineral-acid solution at water-bath temperature. The dyestuff so produced, having most probably the formula:

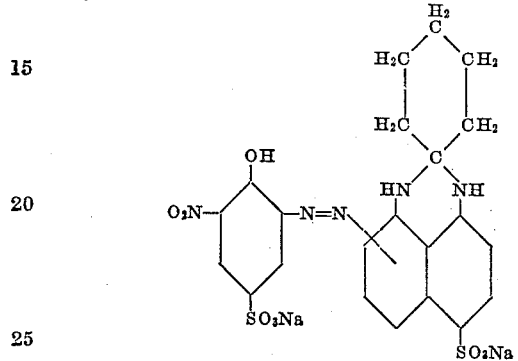

is soluble in water with a reddish-violet color, and in sulfuric acid with a blue color. It yields, on careful reduction with stannous chloride and hydrochloric acid, 2.6-diamino-1-hydroxy-benzol-4-sulfonic acid and the amino compound of the condensation product from 1.8-naphthylenediamino-4-sulfonic acid and cyclohexanone. It colors wool, in an acid bath, bluish-purple; through after-coppering on the fiber a fast blue-black is produced.

If the 6-nitro-2-amino-1-hydroxybenzol-4-sulfonic acid, in the above combination, is replaced by the 4.6-dinitro-2-amino-1-hydroxybenzol, and the dyestuff, thus obtained, is treated with copper sulfate at raised temperature, a copper containing complex compound is obtained which dyes wool, in an acid bath, a bluish-black shade of excellent fastness qualities.

*Example 4*

188 parts by weight of 6-chloro-4-nitro-2-amino-1-hydroxybenzol are diazotized and, in a solution made weakly alkaline with caustic alkali, coupled with 278 parts by weight of the condensation product from 1 mol. of 1.8-naphthylenediamine-4-sulfonic acid and 1 mol. of acetone. The dyestuff, thus obtained having most probably the formula:

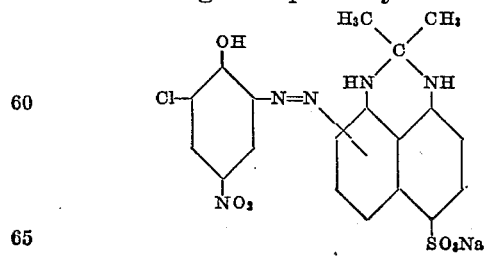

is soluble in water with a reddish-violet color, and in concentrated sulfuric acid with a bluish color. The reduction products obtainable upon careful reduction with stannous chloride and hydrochloric acid are 2.4-diamino-6-chloro-1-hydroxy-benzol and the amino-compound of 2-dimethyl-dihydroperimidine-4'-sulfonic acid. It dyes wool in an acid bath deep bordeau. Through after-chroming the shade changes into an olive of good fastness qualities.

The same dyestuff may be obtained by coupling the above-mentioned diazo compound with 1.8-naphthylenediamine-4-sulfonic acid, isolating the resulting azo-compound, and condensing the thus isolated products, in aqueous solution, with acetone in a weak mineral-acid medium in the warm.

If, in the above example, the diazo-compound of 6-chloro-4-nitro-2-amino-1-hydroxybenzol is replaced by the diazo compound of 4.6-dinitro-2-amino-1-hydroxybenzol and the succeeding operations conducted according to either of the two above described processes, a dyestuff is obtained as the final product which dyes wool, in an acid bath, a reddish dark brown shade. Through coppering afterward, the shade is changed into a beautiful, fast blue-black. A similar, somewhat greener, shade is obtained by dyeing wool, in an acid bath, in the presence of copper salts.

We claim:—

1. Process for the production of new acid azo dyestuffs which comprises coupling ortho-hydroxy-diazo-compounds with a 1.8-naphthylenediamine compound and transforming the resulting acid azo dyestuffs into perimidine compounds by treatment with a suitable agent.

2. As new products ortho-hydroxy-azo-perimidine dyestuffs having most probably the general formula:—

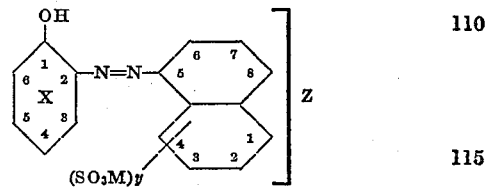

wherein X represents hydrogen, $-NO_2$, $-SO_3H$, $-Cl$, $-COOH$, or alkyl $y$ represents the number 1 or 2, M represents hydrogen or a metal, and Z represents a peri-substituent

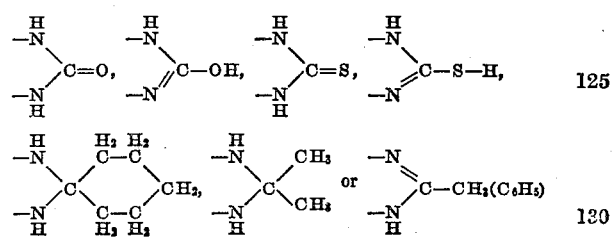

said dyestuffs being, when dried and ground, generally dark, metallic, lustrous powders soluble in concentrated sulfuric acid and in water, and dyeing wool in an acid bath shades fast to washing, fulling, perspiration, carbonizing and light.

3. As new products ortho-hydroxy-azo-perimidine dyestuffs having most probably the general formula:

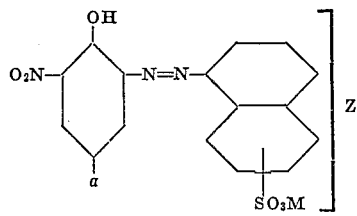

wherein M represents hydrogen or a metal, $a$ represents a nitro- or sulfonic acid group and Z represents a peri-substituent

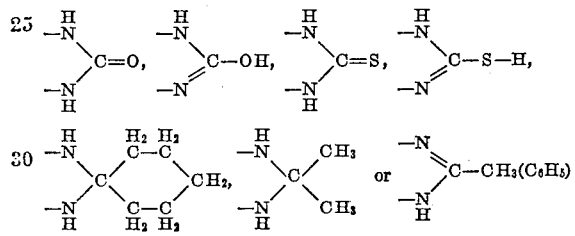

said dyestuffs being, when dried and ground, generally dark, metallic, lustrous powders soluble in concentrated sulfuric acid and in water, and dyeing wool in an acid bath various shades which after chroming are fast to washing, fulling, perspiration, carbonizing and light.

4. As new products the ortho-hydroxy-azo-perimidine dyestuffs having most probably the general formula:

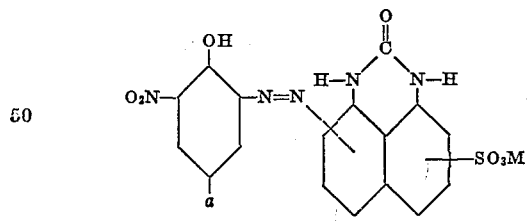

wherein $a$ represents a nitro- or sulfonic acid group and M represents hydrogen or a metal, said dyestuffs being, when dried and ground, generally dark, metallic, lustrous powders soluble in concentrated sulfuric acid and in water, and dyeing wool in an acid bath various shades which after chroming are fast to washing, fulling, perspiration, carbonizing and light.

5. As a new product the ortho-hydroxy-azo-perimidine dyestuff having most probably the formula:

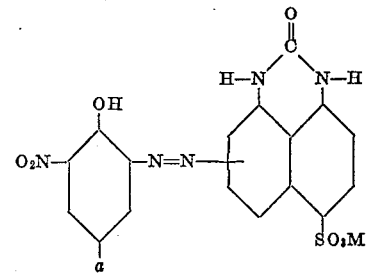

wherein M represents hydrogen or an alkali metal being soluble in concentrated sulfuric acid with a bluish-green color and in water with a bluish-red color and dyeing wool from an acid bath Bordeaux-red shades changing when chromated into clear greenish-blue shades fast to washing, fulling, perspiration, carbonizing and light.

In testimony whereof, we affix our signatures.

WINFRID HENTRICH.
LUDWIG ZEH.